(12) United States Patent
Butzmann et al.

(10) Patent No.: US 10,666,116 B2
(45) Date of Patent: May 26, 2020

(54) ELECTRO DRIVE SYSTEM

(71) Applicant: BERGISCHE UNIVERSITAET WUPPERTAL, Wuppertal (DE)

(72) Inventors: Stefan Butzmann, Schalksmuehle (DE); Marius Finke, Cologne (DE)

(73) Assignee: BERGISCHE UNIVERSITAET WUPPERTAL, Wuppertal (DE)

( * ) Notice: Subject to any disclaimer, the term of this patent is extended or adjusted under 35 U.S.C. 154(b) by 10 days.

(21) Appl. No.: 15/764,637

(22) PCT Filed: Oct. 12, 2016

(86) PCT No.: PCT/EP2016/001688
§ 371 (c)(1),
(2) Date: Mar. 29, 2018

(87) PCT Pub. No.: WO2017/067644
PCT Pub. Date: Apr. 27, 2017

(65) Prior Publication Data
US 2018/0294694 A1    Oct. 11, 2018

(30) Foreign Application Priority Data
Oct. 19, 2015   (DE) .......................... 10 2015 013 403

(51) Int. Cl.
*H02K 5/04* (2006.01)
*H02K 5/20* (2006.01)
(Continued)

(52) U.S. Cl.
CPC ............ *H02K 11/0094* (2013.01); *B60K 1/04* (2013.01); *B60L 50/66* (2019.02); *H01M 2/1077* (2013.01); *H01M 2/1094* (2013.01); *H01M 10/613* (2015.04); *H01M 10/625* (2015.04); *H01M 10/643* (2015.04); *H01M 10/658* (2015.04); *H01M 10/6556* (2015.04); *H02K 5/04* (2013.01); *H02K 5/20* (2013.01); *H02K 9/005* (2013.01); *H02K 11/215* (2016.01);
(Continued)

(58) Field of Classification Search
CPC .. H02K 11/0094; H02K 5/20; H02K 2213/12; H02K 9/005; H02K 11/215; H02K 5/04; H02K 11/33; B60L 50/66; H01M 10/625; H01M 2/1094; H01M 10/613; H01M 10/643; H01M 10/6556; H01M 10/658; H01M 2/1077; H01M 2220/20; B60K 1/04
USPC .............................. 310/68 B, 68 D, 68 R, 89
See application file for complete search history.

(56) References Cited

U.S. PATENT DOCUMENTS 6,930,417 B2* 8/2005 Kaneko .................. H02K 11/33
310/216.001
7,965,003 B2* 6/2011 Nakazawa .............. B60L 9/005
307/43

(Continued)

FOREIGN PATENT DOCUMENTS

DE    202014104276 U    10/2014
EP        2500960 A     9/2012

*Primary Examiner* — John K Kim
(74) *Attorney, Agent, or Firm* — Andrew WIlford

(57) ABSTRACT

The invention relates to an electric drive, in particular for a vehicle, comprising an electric motor (1) and a power supply (6), the power supply (6) being on the radial outer surface of the electric motor (1), and around the electric motor (1) angularly, in particular over an angle of 360°.

15 Claims, 3 Drawing Sheets

(51) Int. Cl.
   *H02K 9/00*      (2006.01)
   *H02K 11/00*     (2016.01)
   *H02K 11/21*     (2016.01)
   *H02K 11/33*     (2016.01)
   *H02K 11/215*    (2016.01)
   *H01M 2/10*      (2006.01)
   *B60K 1/04*      (2019.01)
   *B60L 50/60*     (2019.01)
   *H01M 10/613*    (2014.01)
   *H01M 10/625*    (2014.01)
   *H01M 10/643*    (2014.01)
   *H01M 10/6556*   (2014.01)
   *H01M 10/658*    (2014.01)

(52) U.S. Cl.
   CPC ......... *H02K 11/33* (2016.01); *H01M 2220/20* (2013.01); *H02K 2213/12* (2013.01)

(56) References Cited

U.S. PATENT DOCUMENTS

| | | |
|---|---|---|
| 8,343,812 B2 | 1/2013 | Song |
| 10,250,104 B2 * | 4/2019 | Bradfield ................. H02K 9/06 |
| 2003/0227222 A1 * | 12/2003 | Tabatowski-Bush ........................ H02K 3/522 310/68 R |
| 2003/0228516 A1 | 12/2003 | McDermott |
| 2004/0090130 A1 * | 5/2004 | Kaneko ................... H02K 11/33 310/58 |
| 2005/0184689 A1 * | 8/2005 | Maslov ..................... B60L 8/00 318/400.41 |
| 2007/0141435 A1 | 6/2007 | Hasz |
| 2008/0179999 A1 * | 7/2008 | Nakazawa .............. B60L 9/005 310/68 D |
| 2012/0168223 A1 | 7/2012 | Wang et al. |
| 2012/0168239 A1 * | 7/2012 | Gardes ................. B60K 7/0007 180/65.51 |
| 2014/0084722 A1 * | 3/2014 | Minato ................. H01L 21/561 310/64 |
| 2014/0191624 A1 * | 7/2014 | Jahshan ................. H02K 11/33 310/68 B |
| 2015/0130312 A1 * | 5/2015 | Golka .................... H02K 1/185 310/89 |
| 2015/0228411 A1 | 8/2015 | Owen |
| 2016/0105085 A1 * | 4/2016 | Bradfield ................. H02K 9/06 |
| 2018/0294694 A1 * | 10/2018 | Butzmann ................ B60K 1/04 |

* cited by examiner

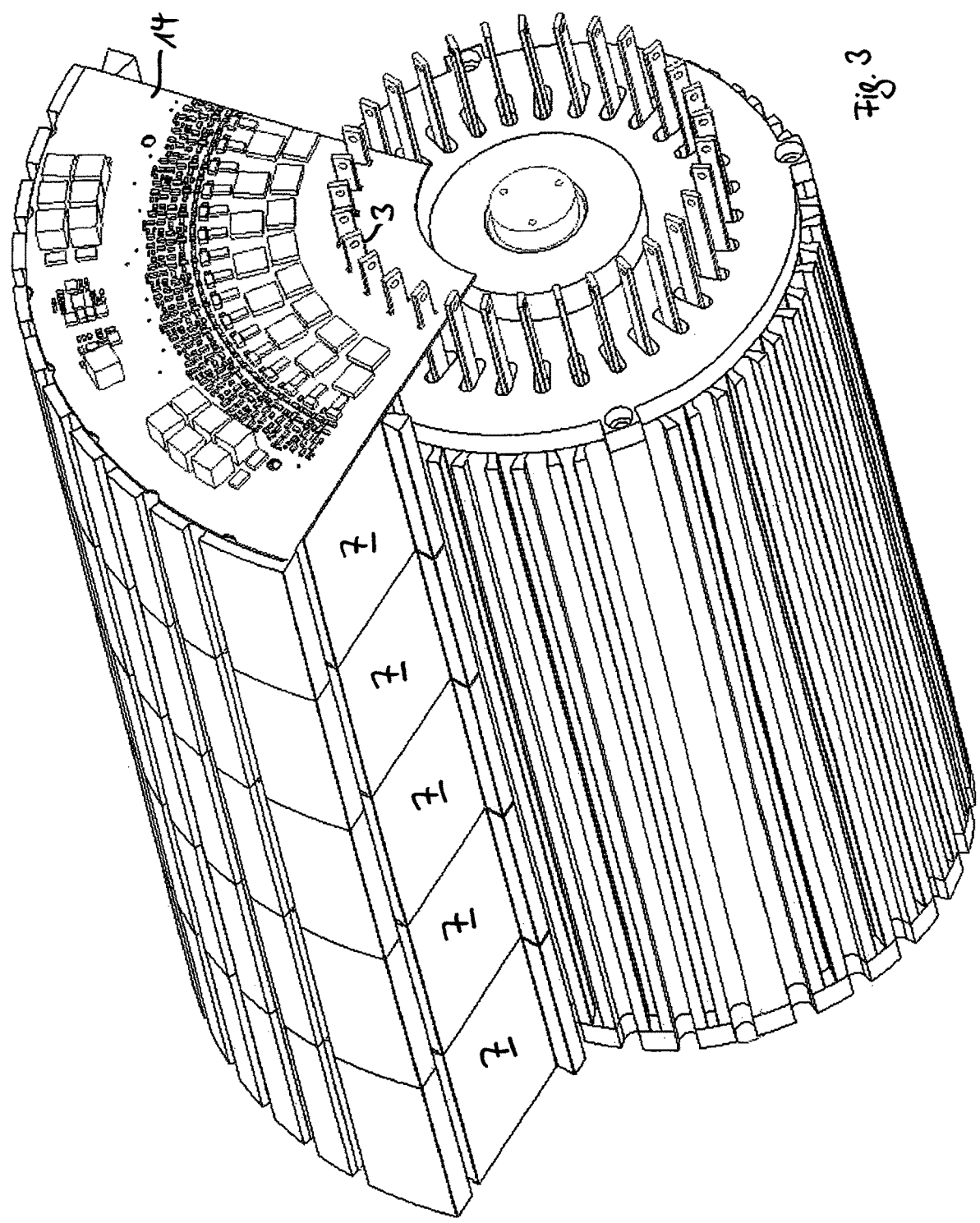

ELECTRO DRIVE SYSTEM

CROSS REFERENCE TO RELATED APPLICATIONS

This application is the US-national stage of PCT application PCT/EP2016/001688 filed 12 Oct. 2016 and claiming the priority of German patent application 102015013403.5 itself filed 19 Oct. 2015.

FIELD OF THE INVENTION

The invention relates to an electric drive, particularly for a vehicle, comprising an electric motor and a power supply, particularly including pulse inverters and power electronics.

BACKGROUND OF THE INVENTION

Today's drives of this type usually have, in the power supply, energy-storing cells such as batteries that are understood in particular to be rechargeable, such as lithium-polymer batteries. In addition, pulse inverters are usually included in such a drive.

In this case, the energy-storing cells perform the task of providing the energy required for operation of the drive, in particular moving the vehicle, and/or storing the energy during charging. The pulse inverter converts the DC voltage provided by the battery into a typically three-phase AC voltage with which an electric motor, such as a synchronous or asynchronous machine, is then operated via power electronics that control the stator windings.

The energy-storing cells, pulse inverters and power electronics are usually manufactured independently of each other, and form independent units that are connected to each other by wire harnesses. In this case, a suitable compromise must always be found as part of the system design between the magnitude of the currents flowing in the system and the voltage level.

For a drive with a power of, for example, 100 kW the battery could either be designed with a DC voltage of 100V and an output current of about 1000 A, or with higher voltages and accordingly lower currents.

For example, in the field of application of today's electric vehicles, a voltage of about 400-600V has prevailed for the time being, resulting in currents in the range of a few hundred amperes. Low voltages and higher currents are not feasible to implement in drives to-date, since the cross-sections of the current-carrying cables and motor windings would need to increase massively, which would lead to an increase in vehicle weight and cost.

The voltage level of, typically, >400V furthermore leads in the prior art to considerable demands in terms of electrical safety of such systems, and introduces considerable difficulty regarding insulation of the individual components of the vehicle chassis and the corresponding insulation monitoring.

These expenses could be reduced only once voltages drop to <60V, as far as VDE standards are concerned. However, the significantly increased currents required in this case cannot be handled in a cost-efficient manner in the drives to-date as a result of distances that must be covered and the required conductor cross-sections.

An essential criterion in the design of an electric or hybrid drive for a vehicle in such a case is the volumetric energy and/or power density, that is, the volume of the electric drive train based on the energy content (that constitutes a measure of the range of the vehicle) and/or based on the weight of the power train.

OBJECT OF THE INVENTION

Against the background of the above explanations, an object of the invention is to produce such an electric drive that is as compact as possible (i.e. with a minimum volume), and to thereby provide a drive that reduces the distances that must be covered between the power supply and the operated electric motor.

Furthermore, it is also preferably an object of the invention to create a drive that provides a redundancy in the power supply, and more preferably that can be operated at significantly reduced voltages with respect to the voltage levels that are currently common, particularly with phase voltages less than or equal to 60 volts, so as to minimize insulation requirements and thereby also the required spacings between the individual components, and thus, ultimately, the costs.

SUMMARY OF THE INVENTION

These objects are attained in that the power supply is provided on the electric motor on the radial outside thereof, and extending around the electric motor angularly. The power supply, and/or a housing accommodating it, need not necessarily extend over the full peripheral angle of 360°; however, this is preferred so that an electric motor is completely surrounded by the power supply in this case.

The essential idea of the invention is to bring the power supply locally as close as possible to the electric motor. Due to the arrangement on the radial outside of the electric motor, in particular on the outer housing surface that, apart from a possible surface contouring/structuring, is typically cylindrical, there is at most the need, apart from internal current paths, to route the energy from the power supply over the axial length of the electric motor, and possibly through the radial spacing between the stator terminals and the power supply. The distances that must be covered are thus significantly reduced compared to the prior art.

Even when such a drive is operated with the voltages used previously, significant advantages are obtained. However, the invention also opens up the possibility of lowering the voltage level, because the resulting, increased conductor cross-sections used to conduct the same power along the shortened conductor paths are manageable.

In the invention, the power supply, and in particular the energy-storing cells (battery cells) required therefor, can be provided in a hollow-cylindrical housing, the electric motor being provided in the interior thereof. Preferably, the cylinder axis of the power supply, and/or of the housing thereof, and the motor axis are coaxial. Also preferably, the arrangement is such that the axial length of the power supply, or of the housing thereof, is at least substantially equal to the axial length of the motor housing, and at most is up to 150% of the length thereof.

The inventive arrangement provides a manageable unit overall, which is defined by the external dimensions of the power supply and completely comprises the electric motor therein, in particular all the electronics for controlling the electric motor and for the energy management of the energy-storing cells.

This also results in increased ease of maintenance, since all the essential components for operation are concentrated in one place, which also reduces the insulation requirements in the previous voltage range due to the thicker encapsulation of the components that carry voltage. For example, it is possible to exchange the complete drive in virtually any workshop.

In a preferred embodiment of the invention, the tubular and cylindrical housing can have a plurality of chambers in which energy-storing cells are held, or at least can be held. These chambers, and in particular further components required for operation, are preferably provided completely between the inner and outer walls of the hollow-cylindrical housing.

For example, the chambers can have a cylindrical shape, such that commercial battery cells with standardized sizes can be held therein, for example, as are known in the case of laptop batteries. The chambers are preferably oriented in such a manner that they extend axially. The battery cells can preferably be provided in the chambers in both possible installation positions that differ by 180°, which simplifies the desired electrical interconnection.

In the invention, the tubular and cylindrical housing can preferably be divided into sections. This results, on the one hand, in a greater ease of maintenance and cost reduction, for example, if defective parts need to be replaced.

On the other hand, however, this opens up the possibility of energy-storing cells (battery cells) being interconnected electrically parallel or in series with each other within a section and/or among the sections as desired.

For example, the invention can provide in this case that, axially, the tubular and cylindrical housing of the power supply is divided into a plurality of rings. By way of example, the axial length of each ring can be adapted to receive exactly one energy-storing cell (battery cell) oriented axially in each cylindrical chamber. The axial length of a ring can be exactly the same as or (slightly) smaller than the axial length of an energy-storing cell, for example. Likewise, the axial length can be adapted to a whole-number multiple (at least twice) of the axial length of an energy-storing cell. Such a ring can form a self-contained energy-storing module, in particular one that, by itself, enables the operation of the electric motor.

According to the invention the tubular and cylindrical housing is divided into at least two segments angularly. Each segment can have an angle of 360°/number of segments. Each such segment extending over the entire axial length of the tubular and cylindrical housing can form a self-contained energy-storing module, in particular that enables by itself the operation of the electric motor.

The above explanations of the subdivision of the tubular and cylindrical housing axially and/or angularly can also be particularly preferably combined, such that each above-described ring section is subdivided angularly into at least two segments. Each (ring-) segment can in turn have an angle of 360°/number of segments. In this case, the total number of all segments lying one after the other axially at the same peripheral position can particularly preferably form an energy-storing module, in particular by electrical interconnection, that particularly enables, by itself, the operation of the electric motor. This results in a number of energy-storing modules that corresponds to the number of segments (per ring).

In such a construction, the housing of the power supply thus has a total number of segments corresponding to the number of rings multiplied by the number of segments per ring. A corresponding variety of possible electrical interconnections can be realized in this way.

In a further preferred embodiment of the above-described construction, at least one interconnection plate is provided between every pair of adjacent segments of rings positioned axially directly one after the other. Each segment can have its own interconnection plate. As a result of such an interconnection plate, the energy-storing cells of each segment can be contacted with each other, for example, all connected in series or all connected in parallel, or divided into groups, and in different groups, the energy-storing cells can be connected differently (series or parallel). Alternatively, if the same interconnection is chosen in the groups, the different groups can be oriented differently in terms of installation position.

Each interconnection plate can also effect the interconnection between the respective two axially adjacent segments, for example, connecting the same in series or in parallel. Preferably, the energy-storing cells of at least a portion of, and preferably all of, the segments provided axially one after the other at the same angular position are electrically connected in series with the interconnection plates. In a possible embodiment, over the axial length of all segments at the same angular position, there can be a voltage corresponding to the sum of the energy-storing cells used in the segments, for example. In contrast, in this embodiment, the poles would be on different axial ends.

For example, in a preferred embodiment, two groups of energy-storing cells can be formed in each segment, wherein in each group, the energy-storing cells are connected in parallel. One group can be provided radially inward, and one radially outward, for example. The energy-storing cells in the different groups can preferably have orientations of the installation position that differ by 180°. This can create the advantage of connecting the parallel-connected energy-storing cells of one group and the parallel-connected energy-storing cells of the other group in series independently of each other axially beyond the segments that have the same angular position, and to have the two poles accessible on the same axial side, in particular on the side having, according to the following embodiments, at least one control plate, for example with power electronics and/or pulse inverters. All the segments (the rings) lying one after the other axially at the same angular position again form an energy-storing module with poles accessible on one side, more or less like a battery pack with the cross-sectional shape of a semicircle.

In one embodiment, the voltages that are summed axially by series connection that originate from respective segments at different angular positions, can again be electrically connected in parallel such that the voltage remains substantially the same, but the capacity of the entire energy storage device increases. An "overall battery" is formed in this embodiment by all the segmental energy-storing modules.

In an embodiment preferred over this, the created energy-storing modules are not connected in parallel. Rather, each of them forms, together with its own electronics on a control plate, a respective self-sufficient functional module that by itself is sufficient to operate the motor. For this purpose, the electronics can include a pulse inverter and switches for energizing the stator. This results in a number of functional modules which corresponds to the number of segments (per ring).

This also creates a redundancy, since a drive of this type is ready for operation even if, for example, one segment or even all segments lying one after the other at the same angular position (and accordingly, a functional module) fails, since this does not eliminate the operating voltage and the stator control, and only reduces the charge capacity (in the context of a vehicle, only its range is reduced).

Electronics can be included that verify the function of each module and completely shut it off when a defect is detected. The remaining functional modules in this case, and thus the drive as a whole, remain operational, with simply a reduction in the range and the torque. Preferably, the shape of each interconnection plate is adapted to the shape of the respective segments, preferably in such a manner that it is congruent with the shape of the segments but is slightly smaller, so as to be enclosed by the segments without the interconnection plate being accessible from outside the housing of the power supply unit, at least not without separating the segments from each other so that they are flush with and contact each other in the operating state in every embodiment. By way of example, the interconnection plate can have the shape of a circular segment. On one angular end of the interconnection plate, it can have contacts to enable electrical connection to other components, such as the plate described below.

In a development according to the invention, one plate is provided in an area between every two angularly adjacent segments (at the same axial position) for all segments positioned axially one after the other with the same angular position, this plate extending axially parallel thereto and particularly extending substantially over the entire axial length of the tubular and cylindrical power supply. This plate can be electrically connected to each above-described interconnection plate between two adjacent segments positioned axially one after the other.

This plate can preferably have electronics for energy-storing cell management, in particular for verifying the series-connected cell voltages, particularly in every segment or in all segments with the same angular position. This plate and its electronics can also be included to perform the previous functional test.

In general, and independently of the different possible embodiments, according to the invention the voltages generated in and with the segments of the energy-storing cells connected in series and/or in parallel are used to form the phase voltages for the motor by at least one electronic controller. Such electronic controller can be formed by electronic components on at least one control plate that is provided on an end face of the electric motor and/or the housing of the power supply, in particular on the end remote from the motor output shaft. This has the advantage that the stator phase connections of the electric motor can be inserted axially in this control plate in a manner producing a contact.

The at least one control plate can at least partially overlap the axial end faces of the power supply unit (and/or its housing) and the electric motor, and can be configured to distribute the energy of the power supply unit to the stator-energizing system of the electric motor, in particular in a manner controlled with or without feedback.

Preferably, each one of the segments of the tubular and cylindrical housing of the power supply extends angularly, or all segments of rings positioned axially one after the other (energy-storing module) at the same angular position have respective control plates that are particularly designed in the shape of a circular ring segment and connected to a part of the stator-energizing system that particularly extends over the same angular range as the respective segment. The described energy-storing module thus forms, together with its control plate, the above-mentioned functional module, that is, a ready-to-operate unit for operating the motor.

With the at least one control plate, and all of the control plates that are functionally assigned to each of the segments and optionally connected to each other, it is accordingly possible to construct a combined power electronics to control the electric motor that receives the respective voltages, particularly the respective serial-connected summed voltages from the sections positioned axially one after the other at the same angular position. As a result, the above-described advantage is created that the electric motor can be operated with the energy of the sections of a single angular position, since the combined power electronics is formed by summing individual power electronics that are each capable of operating the motor by themselves. Each of the power electronics preferably comprises a pulse inverter in this case.

In a very particularly preferred embodiment of the invention, the stator-energizing system of the electric motor can be formed by a plurality of rods that carry current and extend axially through the stator of the electric motor, and that are connected on one of their ends with a shared short-circuit ring and on the other end with a control plate, in particular, a control plate of the above-described type that is provided on the end face.

In this case, the rods are functionally assigned to a number of more than 3 phases, preferably at least 20 phases, and more preferably at least 30 phases. This significant increase in the number of phases compared to the prior art makes it possible for the voltage difference between two phases or one phase and ground to be less than or equal to 60 volts. This leads to the above-described advantage that insulation requirements are significantly lower, and the overall construction is accordingly simplified and cheaper compared to the prior art.

Although the design of the stator with rods is preferred in this embodiment, since the slot fill factor in the stator is improved over coils, in principle such an increase in the number of phases can also be achieved with wound stator coils, which is also included in the invention.

The preferred use of rods also leads to the advantage that lower motor inductances are generated, such that the reduction of the phase voltages is conducive to mastering the rates of current rise.

The switches of the control plate(s) used for energizing the phase connections of the stator can preferably be designed as MOSFETs, in particular if the operating voltage is reduced to less than 60V. The switches are preferably operated in a half-bridge configuration where each half-bridge can supply one rod of the motor.

In a simple embodiment of the invention, the stator-energizing system can be operated with an electrical ground and a positive supply voltage. However, in a preferred embodiment, the short-circuit ring on the end opposite the power-electronics control plate(s) is grounded and the rods are connected between two balanced voltages flanking ground. This allows each rod to be energized individually and independently of the other rods.

In a preferred embodiment, the number of magnetic pole pairs in the rotor of the motor is chosen to be equal to the number of segments angularly of which the segments positioned axially one after the other at the same angular position can be electrically connected to each other to form a cooperating segment, that is, that preferably forms a self-sufficient power supply segment of the combined power supply.

The power electronics are also subdivided into a corresponding number of segments as previously explained with reference to the multiple control plates.

In this case, units of segments and control plates positioned at the same angular position can be grouped spatially into functional modules that can be operated independently of each other, and can therefore be regarded as sub-drive-modules.

In this case, the torques of the functional modules can preferably be summed during operation to form a total torque for the drive, and the individual torques of each module do not necessarily have to be identical. Beyond just the integration of motor, power electronics and battery, this concept offers the following advantages, as indicated above:

1. In the event of a failure of a functional module (for example, all segments positioned axially one after the other at one angular position, along with their interconnection plates, battery management plate, and end-face control plate), the remaining functional modules can continue to operate, preventing overall system failure and resulting only in a performance and/or range reduction.

2. Because battery cells age differently, over time different cell capacities are to be expected, simply due to variance alone. Within a functional module of the power supply, this variance is preferably compensated for by so-called passive balancing, that is (in simplified terms), cells that are too highly charged are discharged to the level of the lower-charged cells. Alternatively, the averaging can also take place actively within a functional module, that is, the energy of over-charged cells is transferred to lower-charged cells by inductive or capacitive methods.

However, the adjustment can also be made between the functional modules via the distribution of the total torque to the individual functional modules.

For the determination of the state of charge and aging of the energy-storing or battery cells, and for the adjustment of the torque of the motor, monitoring of the current in the power supply unit can be implemented, preferably separately in each functional module and in each individual rod.

For this purpose, the lamination of the motor can be supplemented by further sheets with a smaller inner diameter, in which the groove is extended down to the inner diameter. As a result, a Hall sensor can be extend directly from the power electronics into the groove. The sensor is thus integrated into the magnetic circuit around the respective rod, installed to avoid magnetic interference, and at the same time connected via the shortest possible path to the evaluation unit, for example, an AD converter.

The current can be measured in the power supply, and preferably in each functional module, by contacting through the interconnection plates. When a current flows over the same, this current creates a voltage drop that is evaluated in the battery management system. As such, the interconnection plates not only serve the purpose of connecting each pair of segments positioned axially one after the other, and of leading out the cell voltages, but at the same time serve for current sensing.

A central current sensor that measures the current from the short-circuit ring against a reference, such as a vehicle chassis, can also be provided on the short-circuit ring. In the "good case," the current through this sensor is equal to the sum of the currents through all of the rods. As such, the individual current detectors on the rods can be diagnosed. If the value measured at the central sensor does not agree with the sum of the rod currents, an error is diagnosed.

Moreover, if the control is functioning correctly, the current through the sensor provided on the short-circuit ring is zero.

For heat dissipation (cooling) of the system, the heat generated in the electric motor and the power electronics on the control plate or plates can be carried away separately from the heat generated in the power supply, particularly in the segments, and the least possible thermal coupling can be implemented between the cylindrical housing of the power supply and the other described components. This ensures that the motor heat does heat up the power supply, thereby leading to accelerated degradation of the battery cells.

For this purpose, the power supply and the electric motor can be thermally insulated from each other, in particular by a radial spacing, preferably in that the housing of the power supply and the electric motor are connected only by ridges that thus enable a static connection, but only allow comparatively little heat transmission.

Particularly in combination with thermal decoupling, but also independently thereof, the tubular and cylindrical housing of the power supply, and particularly each segment can be plugged or pushed axially onto the outer surface of the electric motor, in particular by means of radial ridges (for example, as described above) that engage at least the ends of axial guide grooves by sliding over them.

The electric motor and the power supply preferably each have their own heat-dissipation systems that are independent of each other, particularly heat pipes that extend axially through the electric motor and/or the power supply.

The overall construction of heat pipes can be designed in 2 layers, with a first inner layer on the outer surface of the electric motor, thermally connected to the same and to the power electronics.

In addition, in this case a thermally insulating material can be installed between the housing of the power supply and the motor, in particular in the above-described radial spacing, this thermally insulating material also pressing the heat pipes against the motor (for a good thermal connection) while also insulating the battery cells of the power supply from the heat generation of the motor and the power electronics.

A second outer layer of heat pipes can be used exclusively for cooling the battery cells and/or the housing of the power supply, preferably mounted on the outer surface of the housing of the power supply or on the inner surface, in particular between the thermal insulator and the housing of the power supply.

In a further embodiment of the invention, the heat of the motor and power electronics can also be dissipated via heat pipes, in particular as described above, and the heat of the power supply can be dissipated via another cooling concept, for example a liquid cooling.

In a preferred embodiment, the heat pipes are routed to the end face of the motor (remote from the power electronics), and thus create a thermal interface, such that the heat guided through the heat pipes axially along the extension of the motor can be dissipated either by air or by liquid cooling.

Conventional rotor position encoders based on magnetic induction can be used for detecting the rotation angle of the motor. However, due to their size, these are only suitable to a very limited degree for such a compact system. As a result, other technical solutions appear advantageous for this purpose.

It appears advantageous to realize the rotational angle detection via a permanent magnet mounted on the shaft, and a rotational angle sensor mounted on an overlying plate, for example, the end-face control plate.

For this purpose, both 360° Hall sensors and also, particularly advantageously, 360°-rotatable magnetoresistive sensors based on the GMR or on the TMR effect can be contemplated. In this case, due to the symmetry of the system when there is an even pole pair number in the rotor and a corresponding number of power-supply segments (modules) and power-electronics units (control plates), a 180° rotation angle sensor can also be used instead of a 360°-capable rotation angle sensor. This allows the use of AMR angle sensors (anisotropic magnetoresistive effect) that are particularly robust in interference fields, and cost-effective.

BRIEF DESCRIPTION OF THE DRAWING

A preferred embodiment will be described with reference to the following figures in which:

FIG. 3 is another view like FIG. 1 illustrating a control plate on the drive.

SPECIFIC DESCRIPTION OF THE INVENTION

Figure 1:
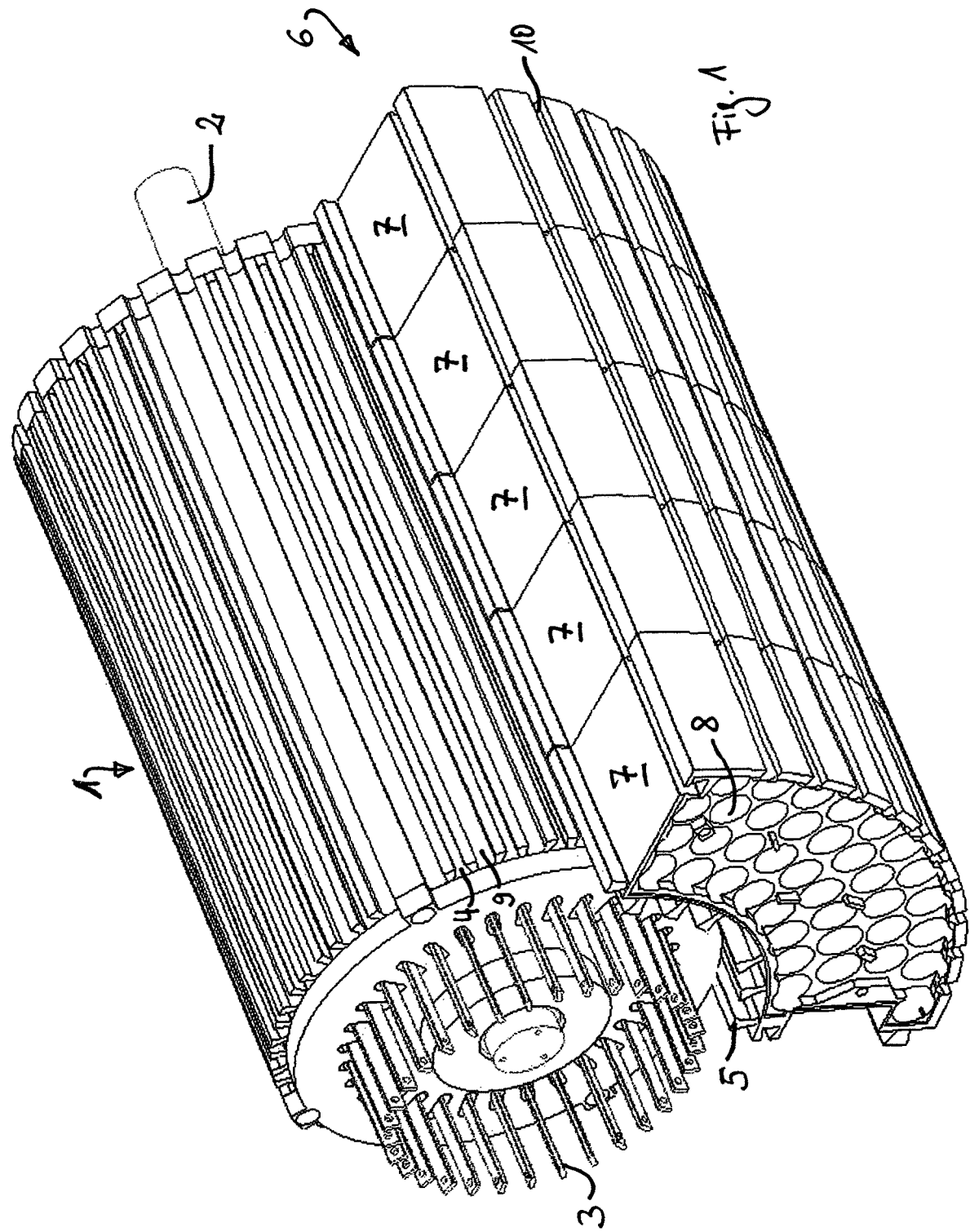
FIG. 1 is an isometric view of parts of an electric drive according to the invention.

FIG. 1 shows an electric drive according to the invention, having an electric motor 1 with an output shaft 2, and rods 3 projecting oppositely from the stator for energizing the stator. The rods can preferably be connected, individually or in groups, to one or more phases, in particular with a phase voltage of less than 60V each.

The outer surface of the electric motor 1 in this embodiment has grooves 4, here with a dovetail cross section, into which complementary ridges 5 on the inner surface of the power supply 6 (shown here only in part) can fit.

The power supply 6 is housed in a tubular and cylindrical housing here divided case both axially and angularly. As a result, the entire tubular and cylindrical housing is formed in a plurality of ring segments 7, of which here only those lying axially one behind the another at one angular position are shown. This angular position extends over an angle of 90°, since there is an angular division into 4 segments.

In this case, standardized battery cells will be used in cylindrical chambers 8 to form the power supply of the motor.

Heat pipes can be fitted in the grooves 9 in order to transfer the heat generated in power electronics (not shown here) and the heat of the motor 1 to the end face at the output shaft 2 end.

Also, the ring segments 7 can have external grooves 10 in which heat pipes enter for conducting away heat.

Figure 2:
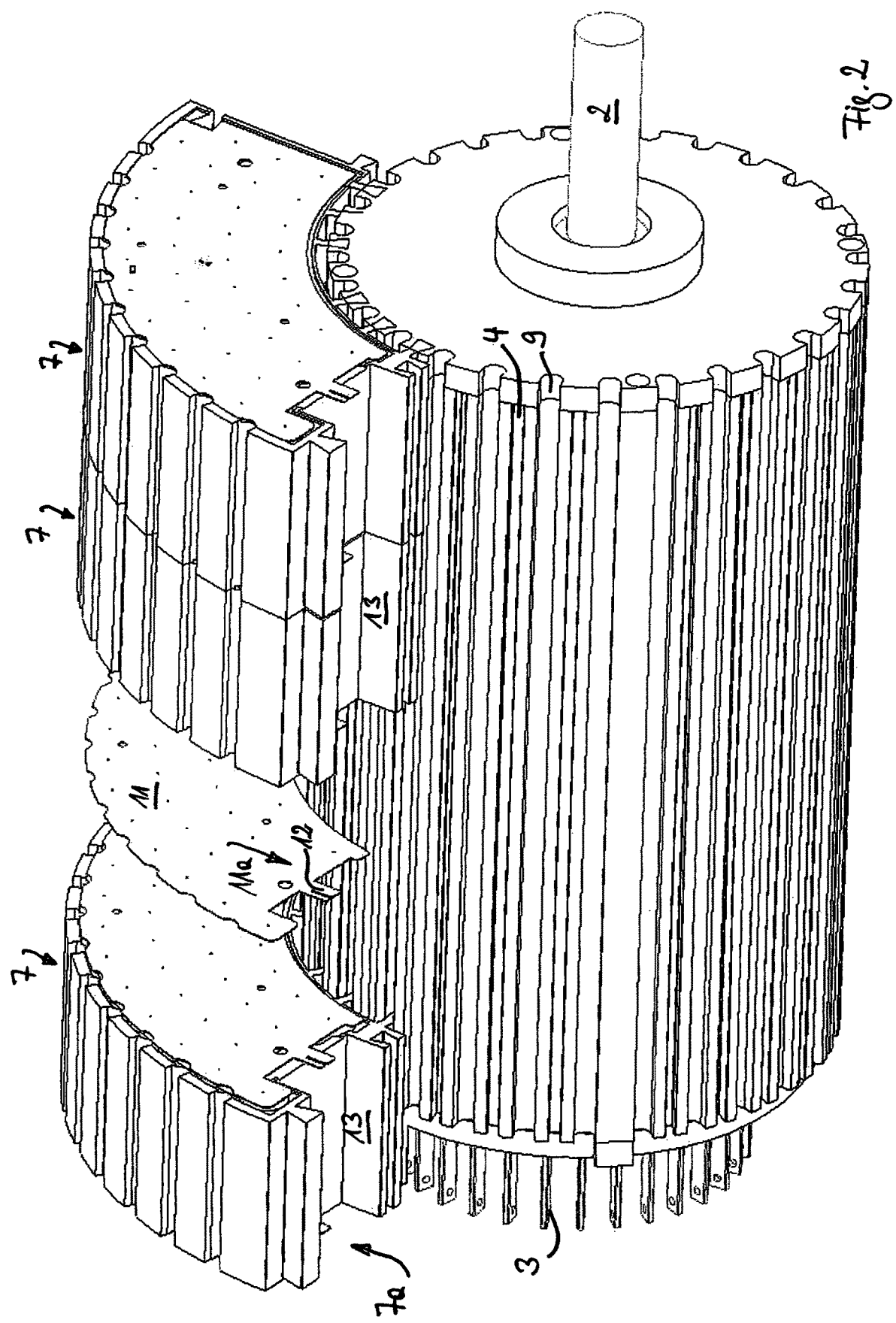
FIG. 2 is a view like FIG. 1 showing further details of the invention.

FIG. 2 shows a view illustrating that interconnection plates 11 (in particular, at least one) can be held between two adjacent segments 7, particularly between each pair of two adjacent segments 7 positioned axially one after the other at the same angular position, to connect the battery cells within each segment 7 and between the adjacent segments 7. For example, all the battery cells contained in the segments can be connected in series in this way. Each segment can have its own respective plate.

Each interconnection plate 11 that is designed in this case in the shape of a circular ring segment, has, on an angularly directed end edge 11a, contacts 12 that can be connected to a plate (not shown) that can be positioned in the space 13 that extends axially and is on an angularly directed end 7a of each segment, and thus is also between two segments that are angularly directly adjacent each other. The plate, not shown here, can manage the battery cells.

FIG. 3 shows the arrangement of a control plate 1 that extends at least substantially over the same angle as the segment 7, and therefore has the shape of a circular ring segment. The control plate 14 shown here carried a power circuit for controlling the rods 3 of the stator that contact the plate 14 in the same angular range by insertion into same.

The control plate covers a part of the end face of the motor 3, and substantially completely covers the end face of the last and/or first segment 7.

The overall arrangement shown here, comprising all segments 7 positioned axially one after the other at this angular position, with the battery cells and plates contained therein, forms a module together with the respective control plate 14 that enables operation of the electric motor by itself.

This also demonstrates that of the inventive power supply unit need not necessarily extend angularly over the complete 360°.

In this example, three further identical such modules (not shown) can be mounted on the motor 1, thus substantially quadrupling the total electric capacity as well as the torque of the motor. These modules, accordingly numbering four, form a power supply in the context of the invention that extends angularly over the complete 360°, in particular also forming a quadruple redundancy in this case.

The invention is not limited to the 4-part segmentation shown here. More or fewer segments can also be employed.

The invention claimed is:

1. An electric drive comprising:
   an electric motor centered on an axis;
   a power supply having a tubular and cylindrical housing radially surrounding the motor and formed by a plurality of axially adjacent rings each divided angularly into at least two segments and formed with a plurality of axially extending chambers each dimensioned to hold a respective axially extending energy-storing cell; and
   an interconnection plate shaped as a circular ring segment and mounted between the segments of adjacent rings positioned axially one after the other.

2. The electric drive according to claim 1, wherein the energy-storing cells of at least a portion of the segments mounted axially one after the other at the same angular position are electrically connected in series by the interconnection plates.

3. The electric drive according to claim 1, further comprising:
   other plates each mounted between angularly adjacent segments for all segments positioned axially one after the other at the same angular position, the other plates each extending axially substantially over an entire axial length of the tubular and cylindrical housing of the power supply with each other plate electrically connected to each interconnection plate between two adjacent segments positioned axially one after the other.

4. The electric drive according to claim 3, wherein the other plates each comprises an electronic circuit for energy-storage-cell management for verifying cell voltages connected in series in each segment or in all segments with the same angular position.

5. An electric drive comprising:
   an electric motor centered on an axis;
   a power supply having a tubular and cylindrical housing radially surrounding the motor and formed by a plurality of axially adjacent rings each formed with a plurality of axially extending chambers each dimensioned to hold a respective axially extending energy-storing cell; and
   at least one control plate mounted at least partially overlapping respective axial end faces of the power supply and the electric motor and configured to distribute energy of the power supply unit to a stator-energizing system of the electric motor.

6. The electric drive according to claim 5, wherein each segment has a respective one of the control plates of the same shape of the respective circular ring segment and is connected to a part of a stator-energizing system that extends over the same angular range as the respective segment.

7. An electric drive comprising:
an electric motor centered on an axis;
a power supply radially substantially surrounding the motor; and
at least one control plate mounted at least partially overlapping respective axial end faces of the power supply and the electric motor and configured to distribute energy of the power supply unit to a stator-energizing system of the electric motor, each control plate forming power electronics, series-connected voltages of each axially extending row of the segments being electrically fed to the power electronics such that the electric motor can be operated by the energy and power electronics of the segments of a single angular position.

8. The electric drive according to claim 7, wherein the stator-energizing system has a plurality of energizing windings or rods that are functionally coupled to at least 3 phases such that the voltage difference between two phases or one phase and ground is less than or equal to 60 volts.

9. An electric drive comprising:
an electric motor centered on an axis;
a power supply radially substantially surrounding the motor; and
at least one control plate mounted at least partially overlapping respective axial end faces of the power supply and the electric motor and configured to distribute energy of the power supply unit to a stator-energizing system of the electric motor, the stator-energizing system being formed by a plurality of energizable rods that extend axially through the stator of the electric motor and that are each connected by one end to a shared short-circuit ring and at an other end to a respective control plate.

10. An electric drive comprising:
an electric motor centered on an axis; and
a power supply having a tubular and cylindrical housing radially surrounding the motor and formed by a plurality of axially adjacent rings each formed with a plurality of axially extending chambers each dimensioned to hold a respective axially extending energy-storing cell, each of the rings being formed by a plurality of angularly fitted-together segments each in turn formed with a plurality of the axially extending chambers and each being plugged or pushed axially onto an outer surface of the electric motor by radial ridges that engage at least with ends of axial guide grooves by sliding thereover.

11. The electric drive according to claim 10, wherein the power supply and the electric motor are thermally insulated from each other by a radial spacing through which the housing of the power supply and the electric motor are connected only by the ridges.

12. The electric drive according to claim 10, wherein the electric motor and the power supply each have their own heat-dissipation systems that are independent of each other and that are formed by heat pipes that extend axially through the electric motor and/or the power supply.

13. An electric drive comprising:
an electric motor centered on an axis;
a power supply radially substantially surrounding the motor;
at least one control plate mounted at least partially overlapping respective axial end faces of the power supply and the electric motor and configured to distribute energy of the power supply unit to a stator-energizing system of the electric motor, at least one groove extending to an inner surface of a stator in a lamination of the electric motor;
a magnetic field sensor mounted in the groove and projecting from the power electronics of a control plate and projects into the groove.

14. An electric drive comprising:
an electric motor centered on an axis and having a shaft; and
a power supply having a tubular and cylindrical housing radially surrounding the motor and formed by a plurality of axially adjacent rings each formed with a plurality of axially extending chambers each dimensioned to hold a respective axially extending energy-storing cell;
at least one permanent magnet for detecting the rotation angle of the shaft of the electric motor with a magnetic field; and
a rotational angle sensor mounted on an overlying plate for detecting the field.

15. An electric drive comprising:
an electric motor centered on an axis; and
a power supply having a tubular and cylindrical housing radially surrounding the motor and formed by a plurality of axially adjacent rings each formed with a plurality of axially extending chambers each dimensioned to hold a respective axially extending energy-storing cell, the power supply and motor both being substantially centered on the axis and the power supply extending over 360° around the motor.

* * * * *